(12) United States Patent
Jia et al.

(10) Patent No.: US 12,356,260 B2
(45) Date of Patent: Jul. 8, 2025

(54) CHANNEL BANDWIDTH ASSIGNMENT BASED ON MOBILE COMMUNICATIONS DEVICE CAPABILITY DATA

(71) Applicant: AT&T Intellectual Property I, L.P., Atlanta, GA (US)

(72) Inventors: Yupeng Jia, Austin, TX (US); Hongyan Lei, Plano, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 397 days.

(21) Appl. No.: 17/809,131

(22) Filed: Jun. 27, 2022

(65) Prior Publication Data

US 2023/0422110 A1    Dec. 28, 2023

(51) Int. Cl.
*H04W 36/00* (2009.01)
*H04W 8/24* (2009.01)

(52) U.S. Cl.
CPC ......... *H04W 36/0072* (2013.01); *H04W 8/24* (2013.01)

(58) Field of Classification Search
CPC ............... H04W 36/0072; H04W 8/24; H04W 72/0453; H04W 72/51
USPC .................................................. 370/331–332
See application file for complete search history.

(56) References Cited

U.S. PATENT DOCUMENTS

| | | | |
|---|---|---|---|
| 2018/0152935 A1* | 5/2018 | Hedayat | H04W 52/0219 |
| 2019/0132857 A1* | 5/2019 | Babaei | H04W 72/23 |
| 2022/0104085 A1* | 3/2022 | Raghavan | H04W 36/0072 |
| 2022/0141919 A1* | 5/2022 | Lee | H04W 28/20 455/552.1 |
| 2022/0279595 A1* | 9/2022 | Jang | H04W 48/18 |
| 2023/0198702 A1* | 6/2023 | Kim | H04L 27/2601 370/329 |
| 2023/0262697 A1* | 8/2023 | Kim | H04L 5/0055 370/329 |
| 2023/0276410 A1* | 8/2023 | Chen | H04W 72/1268 370/329 |
| 2023/0422021 A1* | 12/2023 | Sha | H04W 8/24 |

* cited by examiner

*Primary Examiner* — Candal Elpenord
(74) *Attorney, Agent, or Firm* — Guntin & Gust, PLC; Dana B. LeMoine

(57) ABSTRACT

Aspects of the subject matter described herein are directed towards indicating to a communications network the bandwidth capability data of a user equipment (mobile) device. This allows distinguishing between legacy user equipment that does not support larger bandwidths from newer user equipment that does. A network can thus limit the bandwidth via one of its supported bandwidth parts to a user equipment's bandwidth capability data, such as the maximum supported static bandwidth part of the legacy user equipment. At the same time, larger bandwidths can be assigned to user equipment devices capable of supporting larger bandwidths. Information elements can be used to communicate the bandwidth data from the user equipment to the network, e.g., during initial communications or as requested by the network. Once obtained, the bandwidth data of a user equipment device can be maintained by the network and forwarded to a target cells as part of cell handovers.

20 Claims, 10 Drawing Sheets

```
RF-Parameters-v15g0        ::=        SEQUENCE {
supportedBandCombinationList - v15g0        BandCombinationList-v15g0        OPTIONAL
}

BandNR        ::=        SEQUENCE {
    bandNR                              FreqBandIndicatorNR,
    modifiedMPR-Behaviour               BIT STRING (SIZE (8))                OPTIONAL,
    mimo-ParametersPerBand              MIMO-ParametersPerBand               OPTIONAL,
    extendedCP                          ENUMERATED {supported}               OPTIONAL,
    multipleTCI                         ENUMERATED {supported}               OPTIONAL,
    bwp-WithoutRestriction              ENUMERATED {supported}               OPTIONAL,
   ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
   │ bwp-SameNumerology                ENUMERATED {upto2, upto4}            OPTIONAL, │
   └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
    bwp-DiffNumerology                  ENUMERATED (upto4)                   OPTIONAL,
    crossCarrierScheduling-SameSCS      ENUMERATED {supported}               OPTIONAL,
    pdsch-256QAM-FR2                    ENUMERATED {supported}               OPTIONAL,
    pusch-256QAM                        ENUMERATED {supported}               OPTIONAL,
    ue-PowerClass                       ENUMERATED {pc1, pc2, pc3, pc4}      OPTIONAL,
    rateMatchingLTE-CRS                 ENUMERATED (supported)               OPTIONAL,
```

330 → (entire block)
332 → bwp-SameNumerology row

```
-- ASN1START
-- TAG-BWP-START

BWP ::=                         SEQUENCE {
    locationAndBandwidth            INTEGER (0 .. 37949),
    subcarrierSpacing               SubcarrierSpacing,
    cyclicPrefix                    ENUMERATED { extended
}
}

-- TAG-BWP-STOP
-- ASN1STOP
```

442 → locationAndBandwidth

```
-- ASN1START
-- TAG-FEATURESETDOWNLINKPERCC-START

FeatureSetDownlinkPerCC ::=             SEQUENCE {
    supportedSubcarrierSpacingDL            SubcarrierSpacing,
    supportedBandwidthDL                    SupportedBandwidth,
    channelBW-90mhz                         ENUMERATED
{supported)
    maxNumberMIMO-LayersPDSCH               MIMO-LayersDL
    supportedModulationOrderDL              ModulationOrder
```

452 → supportedBandwidthDL

FIG. 4B

CHANNEL BANDWIDTH ASSIGNMENT BASED ON MOBILE COMMUNICATIONS DEVICE CAPABILITY DATA

TECHNICAL FIELD

The subject application is related to wireless communication systems, and, for example, to assigning bandwidth parts based on the bandwidth capabilities of mobile communications devices.

BACKGROUND

When a radio access network (RAN) upgrades the channel bandwidth of a cell, channel bandwidth A (e.g., 20 megahertz) to a larger channel bandwidth B (e.g., 30 megahertz), problems can occur with legacy mobile devices (also referred to as user equipment devices, or UEs). For example, if a legacy mobile device cannot (or chooses not to) upgrade its software to support the larger channel bandwidth B, the RAN still needs to handle the legacy mobile device that only supports channel bandwidth A. Otherwise, the legacy mobile device will fail to access the cell.

As another problem, consider a RAN cell upgrade from channel bandwidth C (e.g., 40 megahertz) to a larger channel bandwidth D (e.g., 80 megahertz). Because of a lack of UE power saving features on some legacy mobile devices, such legacy mobile devices prefer (or are set) to stay on channel bandwidth C to conserve power by avoiding having to keep scanning the larger channel bandwidth. Indeed, because of this issue, device manufacturers normally disable the larger frequency band.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 3 is an example representation of an information element that can be used to indicate bandwidth part support by a user equipment device, in accordance with various aspects and embodiments of the subject disclosure.

FIG. 4A is an example representation of an information element that can be used to indicate maximum (or other) static bandwidth part supported by a user equipment device, in accordance with various aspects and embodiments of the subject disclosure.

FIG. 4B is an example representation of an information element that can be used to indicate maximum (or other) static bandwidth supported by a user equipment device per band combination, in accordance with various aspects and embodiments of the subject disclosure.

DETAILED DESCRIPTION

Figure 1:
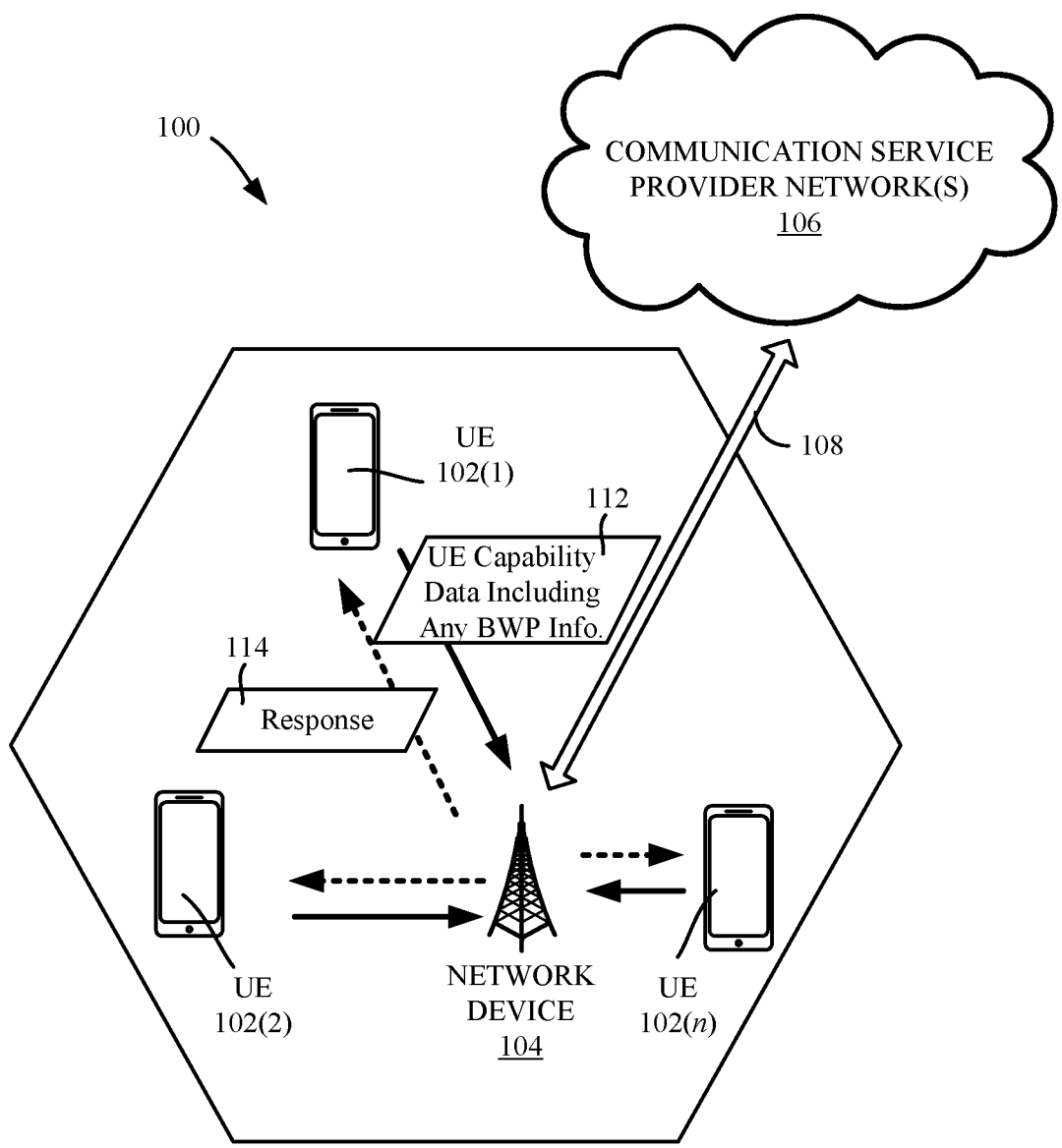
FIG. 1 illustrates an example wireless communication system in which a user equipment reports supported bandwidth-related data to a network device for use in selecting a bandwidth part, in accordance with various aspects and embodiments of the subject disclosure.

Various aspects of the technology described herein are directed towards a framework or the like that handles spectrum expansion, including for legacy mobile devices/legacy user equipment devices (UEs) that cannot backport to support larger channel bandwidths. To this end, in one implementation, the technology described herein uses an information element (IE) to allow a user equipment to indicate capability data to a network, including to send a signaling bit to differentiate legacy UEs without larger channel bandwidth support from newer, non-legacy UEs that can support larger channel bandwidths.

In this way, a UE can indicate to the network regarding its hardware/software limitations, whereby this delta data in the IE can be used to distinguish between a UE that supports a static lower bandwidth part versus larger channel bandwidth UEs. With this information, the network is able to limit the bandwidth for a legacy UE to its maximum supported channel bandwidth. More particularly, the network can dynamically assign channel bandwidth based on a UE's supported maximum channel bandwidth and bandwidth part switching capability.

A result of the technology described herein is more optimal, dynamic power usage for legacy and newer (non-legacy) UEs that can each support a different maximum channel bandwidth.

It should be understood that any of the examples and terms used herein are non-limiting. For instance, the examples are based on legacy device versus new radio (NR, sometimes referred to as 5G) communications between a user equipment exemplified as a smartphone or the like and network device; however virtually any communications devices may benefit from the technology described herein, and/or their use in different spectrums may likewise benefit. For example, legacy LTE devices can leverage the technology described herein. Thus, any of the embodiments, aspects, concepts, structures, functionalities or examples described herein are non-limiting, and the technology may be used in various ways that provide benefits and advantages in radio communications in general.

In some embodiments the non-limiting term "radio network node" or simply "network node," "radio network device or simply "network device" is used herein. These terms may be used interchangeably, and refer to any type of network node that serves user equipment and/or connected to other network node or network element or any radio node from where user equipment receives signal. Examples of radio network nodes are Node B, base station (BS), multi-standard radio (MSR) node such as MSR BS, gNodeB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

In some embodiments the non-limiting term user equipment (UE) is used. It refers to any type of wireless device that communicates with a radio network node in a cellular or mobile communication system. Examples of user equipment are target device, device to device (D2D) user equipment, machine type user equipment or user equipment capable of machine to machine (M2M) communication, PDA, Tablet, mobile terminals, smart phone, laptop embedded equipped (LEE), laptop mounted equipment (LME), USB dongles etc.

Some embodiments are described in particular for 5G new radio systems. The embodiments are however applicable to any radio access technology (RAT) or multi-RAT system where the user equipment operates using multiple carriers e.g. LTE FDD/TDD, WCMDA/HSPA, GSM/GERAN, Wi Fi, WLAN, WiMax, CDMA2000 etc.

The embodiments are applicable to single carrier as well as to multicarrier (MC) or carrier aggregation (CA) operation of the user equipment. The term carrier aggregation (CA) is also called (e.g. interchangeably called) "multi-carrier system", "multi-cell operation", "multi-carrier operation", "multi-carrier" transmission and/or reception.

Note that the solutions outlined equally applies for Multi RAB (radio bearers) on some carriers (that is data plus speech is simultaneously scheduled).

FIG. 1 illustrates an example wireless communication system 100 in accordance with various aspects and embodiments of the subject technology. In one or more embodiments, the system 100 can comprise one or more user equipment (UEs) 102(1)-102(n), also referred to herein as "mobile devices," "mobile communications devices" or the like.

In various embodiments, the system 100 is or comprises a wireless communication network serviced by one or more wireless communication network providers. In example embodiments, a UE 102 can be communicatively coupled to the wireless communication network via a network device 104 (e.g., network node/network equipment). The network device 104 can communicate with the user equipment (UE) 102, thus providing connectivity between the UE and the wider cellular network.

In example implementations, each UE 102 such as the UE 102(1) is able to send and/or receive communication data via a wireless link to the network device 104. The dashed arrow lines from the network device 104 to the UE 102 represent downlink (DL) communications and the solid arrow lines from the UE 102 to the network devices 104 represents uplink (UL) communications.

The system 100 can further include one or more communication service provider networks 106 that facilitate providing wireless communication services to various user equipment, including UEs 102(1)-102(n), via the network device 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.).

The network device 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

In various embodiments, the system 100 can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

In FIG. 1, as described herein, a user equipment (e.g., 102(1)) is configured to report (block 112) its capability data, including whether bandwidth parts are supported, and/or which bandwidth parts are targeted (typically the maximum supported bandwidth part, but possibly less if for example the device is avoiding overheating, conserving power and so forth) by that user equipment. From the frequency domain perspective, a bandwidth part is a contiguous set of physical resource blocks on a carrier that is selected from a contiguous subset of the common resource blocks for a given numerology. From the time domain perspective, the channel bandwidth is static but the network and/or UE can change the PDCCH (physical downlink control channel) monitoring occasions; e.g., dense (e.g., every A slots) or sparse (e.g., every B slots). The technology described herein be used for frequency domain bandwidth parts as well as time domain bandwidth parts.

A response 114 such as an acknowledgment or the like may be returned. Reporting can occur automatically when the user equipment (e.g., 102(1)) connects to the network device 104 and reports its capability data, as well as on a regular or occasional basis, and/or when requested by the network. This can be via information elements as described herein with reference to FIGS. 3, 4A and 4B, although alternatively one or more proprietary communication(s) are feasible.

By way of example, consider that the network expands a cell's maximum spectrum support in the future, from a current maximum of 40 MHz (currently in use) to 100 MHz (in the future). Because of lacking mobile device power saving support to handle larger bandwidth, legacy mobile devices (that cannot or do not software backport), desire to limit the maximum channel bandwidth to 40 MHz.

Continuing with the example, consider that the network supports four static bandwidth parts (BWPs), e.g., BWP1=100 MHz, BWP2=80 MHz, BWP3=60 MHz and BWP4=40 MHz. Prior to the capability reporting, the network initially does not know the mobile device's capability data, and as such the BWP 0 (the initial BWP in system information block (SIB1)) needs to be set to the minimum bandwidth part of BWP4, equal to min{BWP1, BWP2, BWP3, BPW4}, which in this example equals 40 MHz.

From the mobile device capability data 112, (e.g., via the information elements as described with reference to FIGS. 3, 4A and 4B, such as defined in and/or extensions to the Third Generation Partnership Project (3GPP) standards), the network determines whether this mobile device 102(1) is capable of supporting one of the supported bandwidth parts, which in this example are 40 megahertz versus 60 megahertz versus 80 megahertz versus 100 megahertz. Based on the determination, (wherein in this example consider that the UE 102(1) is a legacy mobile device), the network equipment assigns the dedicated bandwidth part to BWP4 (40 megahertz) for the legacy mobile device. Note that if the UE 102(1) instead reported in its capability data that it can support 65 megahertz, for example, the network may assign the dedicated bandwidth part to BWP3 (60 megahertz) for the mobile device. The use of such 3GPP IEs (repurposing the meaning of data in already defined 3GPP information elements) as described herein can thus basically create a proprietary network and UE signaling protocol to distinguish devices based on their respective reported UE capability data.

For a newer, non-legacy mobile device such as the UE 102(2), the network assigns one of BWP1-BWP4, such as based on mobile device needs. For example, a mobile device running an application program that communicates a significant amount of data, with the amount measurable to the network (e.g., via network buffers/buffer threshold), can be given a larger bandwidth part relative to a mobile device that is not using much data. This can be updated over time as appropriate.

Returning to the legacy UE 102(1) example of 40 megahertz maximum support, once determined, in one implementation the network saves the mobile device capability data (including the default bandwidth part of 40 megahertz in this example for the legacy UE 102(1)) and schedules the legacy mobile device with 40 megahertz spectrum. Note that the mobile device capability is stored at the network and forwarded during handovers to target cells; in this way, a target cell will continue to allocate 40 megahertz channel bandwidth for the legacy mobile devices without needing to reobtain the information from the mobile device.

Figure 2:
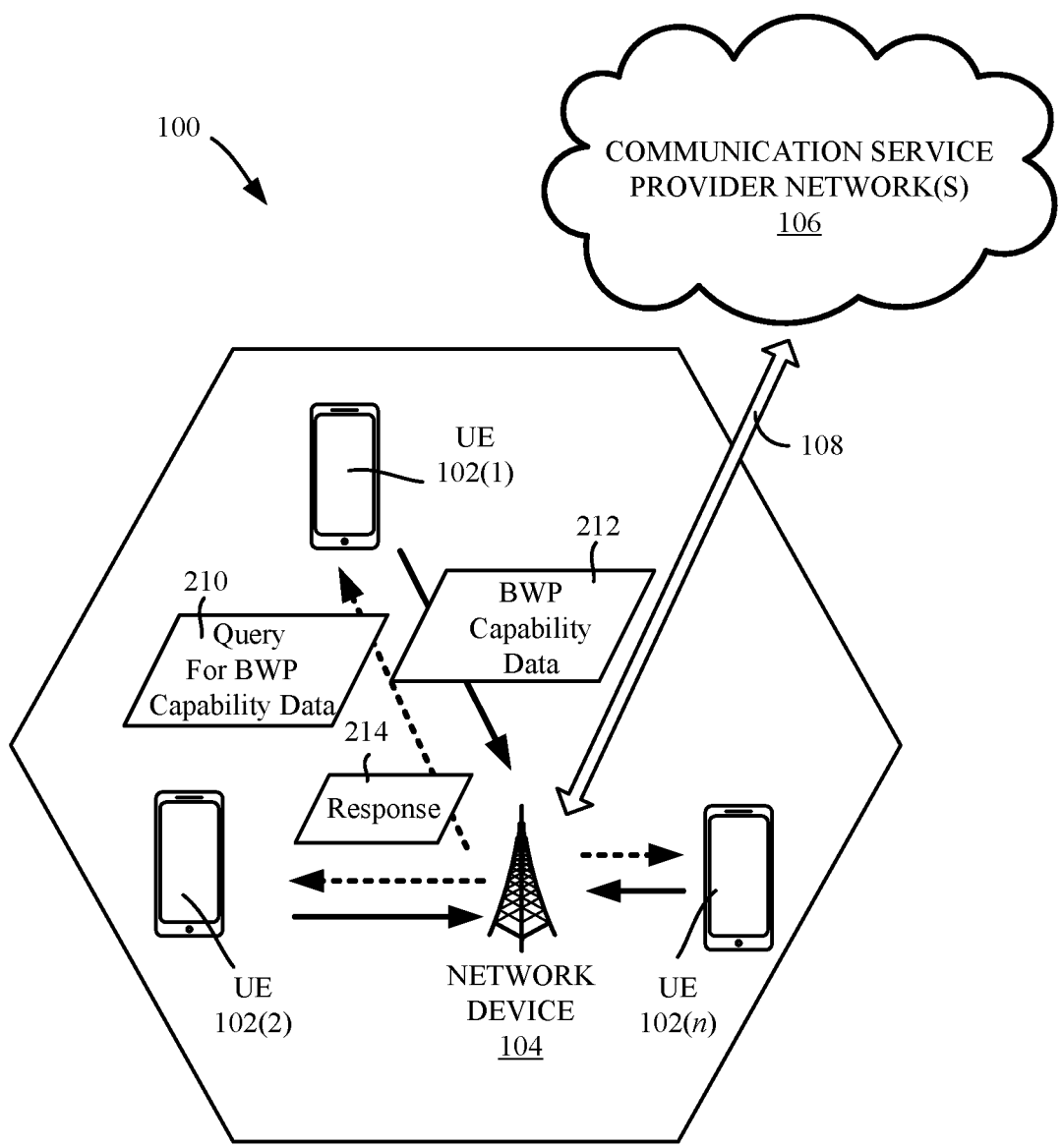
FIG. 2 illustrates an example wireless communication system in which a network device queries a user equipment to report bandwidth data, in accordance with various aspects and embodiments of the subject disclosure.

As represented in FIG. 2, as an alternative (or in addition) to initial reporting of the supported bandwidth parts, the network device 104 can request a mobile device to send the mobile device capability with bandwidth part information, if it does not have it (event trigger). For example, a temporary network may be set up for a stadium scenario in which large event attendance is expected; when set up, the new network may desire such information to benefit legacy UEs. Another alternative is that a mobile device's data usage can change, whereby an updated bandwidth part, to the extent it does not exceed that supported by the mobile device, may be selected for the mobile device. It is also possible that a target cell has different bandwidth parts and may try to match a different maximum to the mobile device bandwidth part capability.

In the example of FIG. 2, the network device 104 can thus send a query (block 210) to the user equipment 102(1) requesting the information. In other words, at any time the network can trigger a user equipment inquiry and ask the user equipment 102(1) to report its capabilities, including with respect to supported bandwidth. The user equipment 102(1) can thus return the bandwidth capability data (block 212) on demand A response (block 214) such as an acknowledgement can be returned.

As set forth herein, in one implementation information element(s) can be used to indicate the bandwidth part capability data, including support of bandwidth parts as well as the maximum (or otherwise desired/targeted) bandwidth part supported. By way of example, FIG. 3 shows one way in which a UE Indicates the support of bandwidth parts in one implementation, namely via an information element 330 containing a BWP-SameNumerology entry 332 (DCI based BWP switching). This 3GPP information element 330 and entry 332 can be thus repurposed/further used as described herein to determine whether BWP support.

FIG. 4A shows how an information element 440 via a "locationAndBandwidth" entry 442 allows a UE to indicate the maximum static BWP that the UE supports. The maximum bandwidth can be determined from the integer value as defined in 3GPP.

Additionally, a UE can indicate the maximum supported bandwidth per band combination basis using an IE. For example, as represented in FIG. 4B, the FeatureSetDownlinkPerCC information element 450, which indicates a set of features that the UE supports on the corresponding carrier of one band entry of a band combination, includes a supportedBandwidthDL entry 452 by which this data can be reported.

Figure 5:
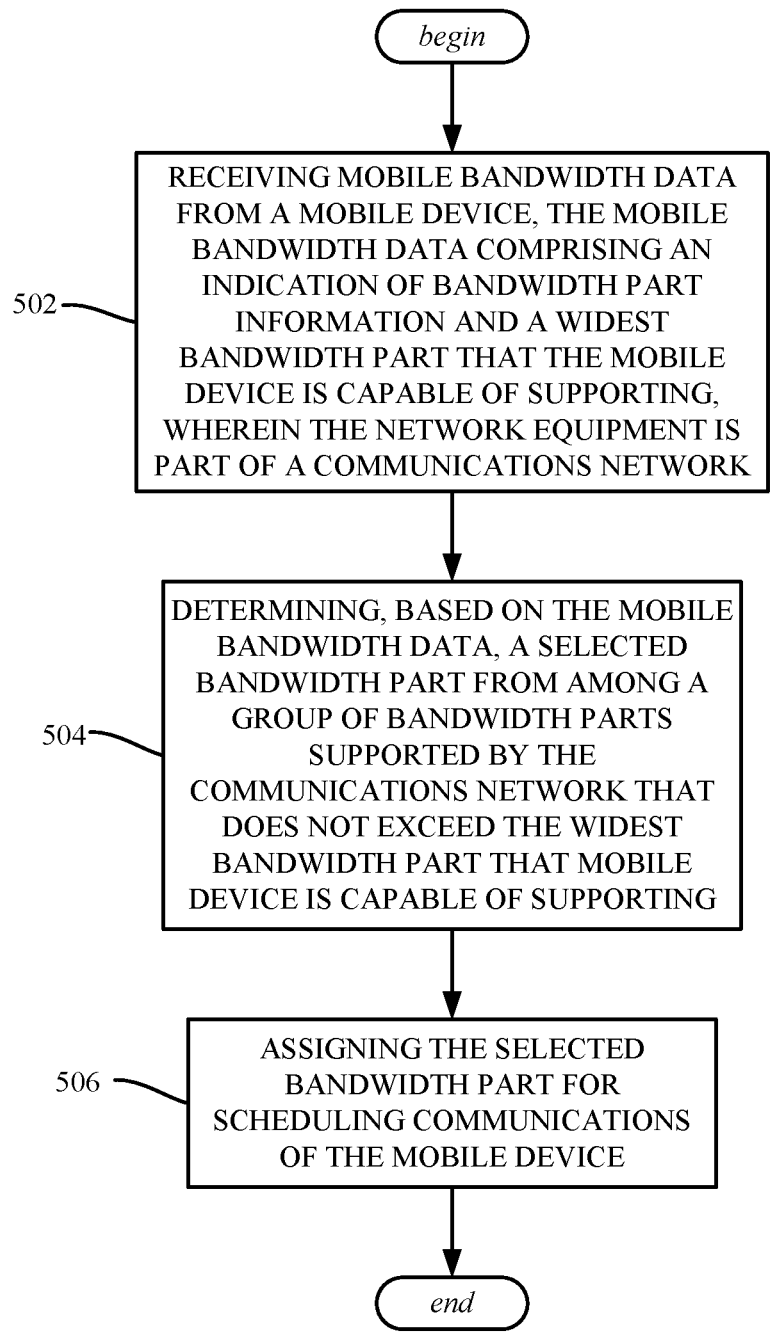
FIG. 5 illustrates example operations of a network device with respect to receiving supported bandwidth data and assigning a bandwidth part based thereon, in accordance with various aspects and embodiments of the subject disclosure.

One or more aspects, such as those implemented in example operations of network equipment comprising a processor and a memory that stores executable instructions that, when executed by the processor, facilitate performance of operations and/or components, or, for example, operations of a method, are shown in FIG. 5 in accordance with various aspects and embodiments of the subject disclosure. Operation 502 represents receiving mobile bandwidth data from a mobile device, the mobile bandwidth data comprising an indication of bandwidth part information and a widest bandwidth part that the mobile device is capable of supporting, wherein the network equipment is part of a communications network. Operation 504 represents determining, based on the mobile bandwidth data, a selected bandwidth part from among a group of bandwidth parts supported by the communications network that does not exceed the widest bandwidth part that mobile device is capable of supporting. Operation 506 represents assigning the selected bandwidth part for scheduling communications of the mobile device.

Further operations can include maintaining, in storage accessible via the communications network, the mobile bandwidth data in association with an identity of the mobile device, and forwarding the mobile bandwidth data to a target cell in conjunction with a handover of the mobile device to the target cell.

Receiving the mobile bandwidth data can include receiving an information element that comprises an indication that the mobile device supports bandwidth parts.

Receiving the mobile bandwidth data can include receiving an information element that comprises data representing a maximum static bandwidth part supported by the mobile device.

Receiving the mobile bandwidth data bandwidth data can include receiving a first information element that comprises an indication that the mobile device supports bandwidth parts, and receiving a second information element that can include data representing a maximum static bandwidth part supported by the mobile device.

Receiving the mobile bandwidth data comprises receiving an information element that can include data representing a maximum static bandwidth part per band supported by the mobile device.

Further operations can include requesting the mobile bandwidth data from the mobile device, and wherein the receiving of the mobile bandwidth data occurs in response to the requesting of the mobile bandwidth data.

Receiving the bandwidth data can include receiving an information element.

Receiving the bandwidth data can include receiving the bandwidth data as part of capability reporting by the mobile device.

The selected bandwidth part can be a first selected bandwidth part, and further operations can include selecting, based on communications of the mobile device, a second selected bandwidth part that does not exceed the widest bandwidth part that mobile device is capable of supporting, and assigning the second selected bandwidth part for scheduling future communications of the mobile device, after the communications.

Figure 6:
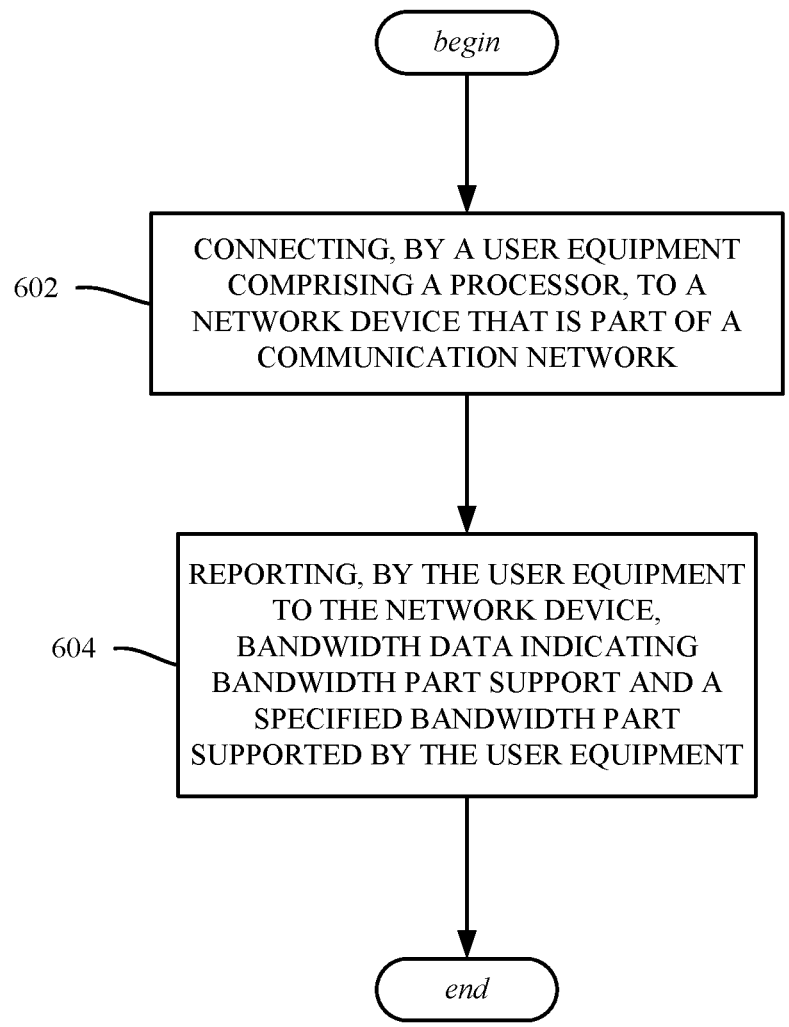
FIG. 6 illustrates example operations of a user equipment with respect to providing supported bandwidth data to a network device, in accordance with various aspects and embodiments of the subject disclosure.

One or more example aspects are represented in FIG. 6, and can correspond to a method, for example, or a user equipment device comprising a processor and a memory that stores executable instructions that, when executed by the processor, facilitate performance of operations and/or components. Example operations can include operation 602, which represents connecting, by a user equipment comprising a processor, to a network device that is part of a communication network. Example operation 604 represents reporting, by the user equipment to the network device, bandwidth data indicating bandwidth part support and a specified bandwidth part supported by the user equipment.

Further operations can include selecting, by the user equipment as the specified bandwidth part, data representing a maximum static bandwidth part supported by the user equipment. The reporting can occur in response to the connecting.

Further operations can include receiving, by the user equipment, a request for the bandwidth data from the network device; the reporting can occur in response to the request.

Reporting the bandwidth data indicating the bandwidth supported by the user equipment can include sending the bandwidth data as part of an information element.

Figure 7:
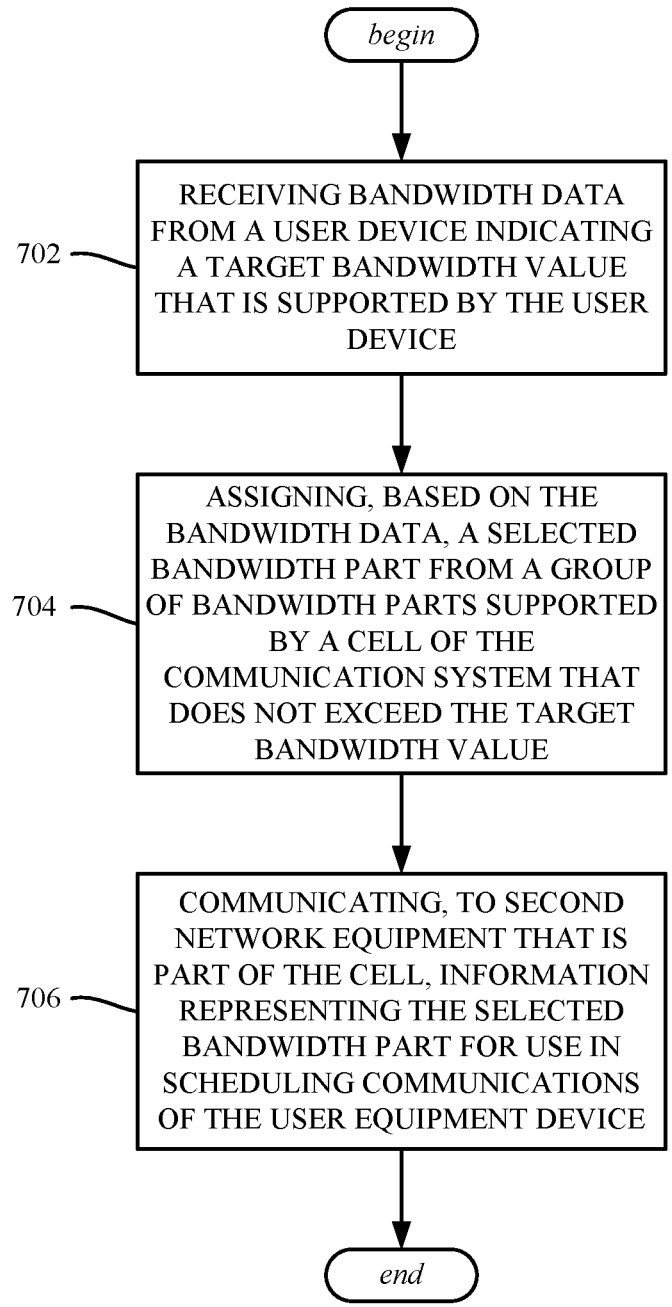
FIG. 7 illustrates example operations of a network device with respect to receiving supported bandwidth data, assigning a bandwidth part based thereon and using the bandwidth part for scheduling user equipment communications, in accordance with various aspects and embodiments of the subject disclosure.

One or more aspects, such as implemented in a machine-readable storage medium, comprising executable instructions that, when executed by a processor of first network equipment of a communication system, facilitate performance of operations, are represented in FIG. 7. Example operations comprise operation 702, which represents receiving bandwidth data from a user device indicating a target bandwidth value that is supported by the user device. Example operation 704 represents assigning, based on the bandwidth data, a selected bandwidth part from a group of bandwidth parts supported by a cell of the communication system that does not exceed the target bandwidth value. Example operation 706 represents communicating, to second network equipment that is part of the cell, information representing the selected bandwidth part for use in scheduling communications of the user equipment device.

Further operations can include maintaining the user equipment bandwidth data in association with an identity of the user device, and forwarding the user equipment bandwidth data to a target cell in conjunction with a transfer of network service of the user device from the cell to the target cell.

The selected bandwidth part can be a first selected bandwidth part, and further operations can include selecting, based on communications of the user device, a second selected bandwidth part that does not exceed the widest bandwidth part that user device is capable of supporting, and assigning the second selected bandwidth part for scheduling future communications of the user device.

Further operations can include requesting the user equipment bandwidth data from the user device; receiving of the user equipment bandwidth data can occur in response to the requesting of the user equipment bandwidth data.

Receiving the user equipment bandwidth data bandwidth data can include receiving an information element that can include data representing a maximum static bandwidth part supported by the user device as the target bandwidth value.

As can be seen, the technology described herein facilitates distinguishing a legacy UE and newer/non-legacy UE with different channel bandwidth capability data. An updated network is this able to support both legacy UEs (backward compatible) and newer/non-legacy UEs. Among its benefits, the technology described herein can reduce the repeated camping failures resulting from legacy UEs not being able to camp on a newer RAN cell with larger channel bandwidth, can improve spectrum efficiency by allocating resources for both new UEs and legacy UEs, improve the user experience for legacy UEs by continuing to use the time division duplex spectrum with high speed. This further enables smooth network upgrade and spectrum migration, while simplifying network operation and saving costs.

Figure 8:
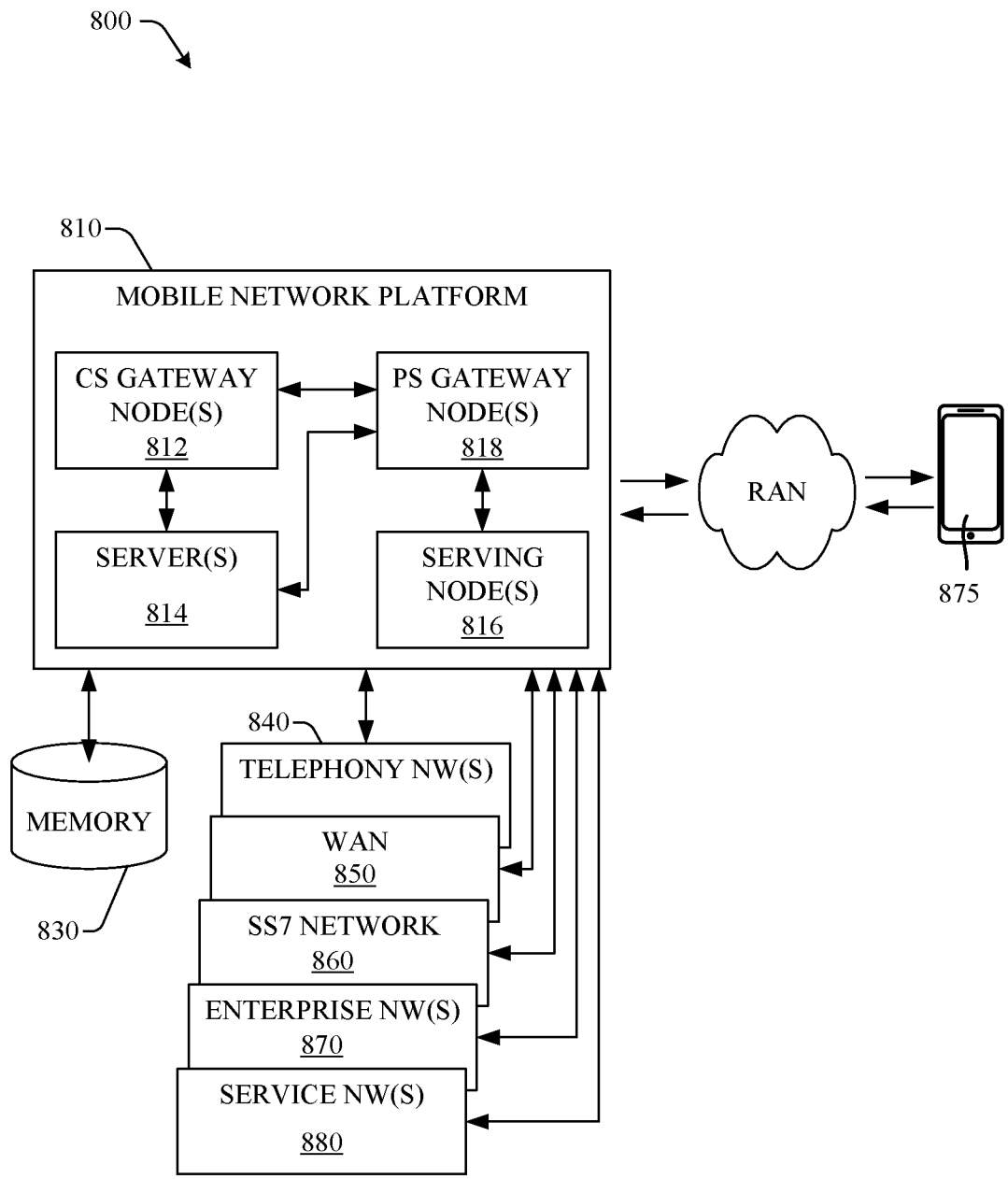
FIG. 8 illustrates an example block diagram of a non-limiting embodiment of a mobile network platform in accordance with various aspects described herein.

FIG. 8 presents an example embodiment 800 of a mobile network platform 810 that can implement and exploit one or more aspects of the disclosed subject matter described herein. Generally, wireless network platform 810 can include components, e.g., nodes, gateways, interfaces, servers, or disparate platforms, that facilitate both packet-switched (PS) (e.g., internet protocol (IP), frame relay, asynchronous transfer mode (ATM) and circuit-switched (CS) traffic (e.g., voice and data), as well as control generation for networked wireless telecommunication. As a non-limiting example, wireless network platform 810 can be included in telecommunications carrier networks, and can be considered carrier-side components as discussed elsewhere herein. Mobile network platform 810 includes CS gateway node(s) 812 which can interface CS traffic received from legacy networks like telephony network(s) 840 (e.g., public switched telephone network (PSTN), or public land mobile network (PLMN)) or a signaling system #7 (SS7) network 860. Circuit switched gateway node(s) 812 can authorize and authenticate traffic (e.g., voice) arising from such networks. Additionally, CS gateway node(s) 812 can access mobility, or roaming, data generated through SS7 network 860; for instance, mobility data stored in a visited location register (VLR), which can reside in memory 830. Moreover, CS gateway node(s) 812 interfaces CS-based traffic and signaling and PS gateway node(s) 818. As an example, in a 3GPP UMTS network, CS gateway node(s) 812 can be realized at least in part in gateway GPRS support node(s) (GGSN). It should be appreciated that functionality and specific operation of CS gateway node(s) 812, PS gateway node(s) 818, and serving node(s) 816, is provided and dictated by radio technology(ies) utilized by mobile network platform 810 for telecommunication. Mobile network platform 810 can also include the MMEs, HSS/PCRFs, SGWs, and PGWs disclosed herein.

In addition to receiving and processing CS-switched traffic and signaling, PS gateway node(s) 818 can authorize and authenticate PS-based data sessions with served mobile devices. Data sessions can include traffic, or content(s), exchanged with networks external to the wireless network platform 810, like wide area network(s) (WANs) 850, enterprise network(s) 870, and service network(s) 880, which can be embodied in local area network(s) (LANs), can also be interfaced with mobile network platform 810 through PS gateway node(s) 818. It is to be noted that WANs 850 and enterprise network(s) 870 can embody, at least in part, a service network(s) like IP multimedia subsystem (IMS). Based on radio technology layer(s) available in technology resource(s) 817, packet-switched gateway node(s) 818 can generate packet data protocol contexts when a data session is established; other data structures that facilitate routing of packetized data also can be generated. To that end, in an aspect, PS gateway node(s) 818 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 800, wireless network platform 810 also includes serving node(s) 816 that, based upon available radio technology layer(s) within technology resource(s) 817, convey the various packetized flows of data streams received through PS gateway node(s) 818. It is to be noted that for technology resource(s) 817 that rely primarily on CS communication, server node(s) can deliver traffic without reliance on PS gateway node(s) 818; for example, server node(s) can embody at least in part a mobile switching center. As an example, in a 3GPP UMTS network, serving node(s) 816 can be embodied in serving GPRS support node(s) (SGSN).

For radio technologies that exploit packetized communication, server(s) 814 in wireless network platform 810 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 810. Data streams (e.g., content(s) that are part of a voice call or data session) can be conveyed to PS gateway node(s) 818 for authorization/authentication and initiation of a data session, and to serving node(s) 816 for communication thereafter. In addition to application server, server(s) 814 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 810 to ensure network's operation and data integrity in addition to authorization and authentication procedures that CS gateway node(s) 812 and PS gateway node(s) 818 can enact. Moreover, provisioning server(s) can provision services from external network(s) like networks operated by a disparate service provider; for instance, WAN 850 or Global Positioning System (GPS) network(s) (not shown). Provisioning server(s) can also provision coverage through networks associated to wireless network platform 810 (e.g., deployed and operated by the same service provider), such as femto-cell network(s) (not shown) that enhance wireless service coverage within indoor confined spaces and offload RAN resources in order to enhance subscriber service experience within a home or business environment by way of UE 875.

It is to be noted that server(s) 814 can include one or more processors configured to confer at least in part the functionality of macro network platform 810. To that end, the one or more processor can execute code instructions stored in memory 830, for example. It is should be appreciated that server(s) 814 can include a content manager 815, which operates in substantially the same manner as described hereinbefore.

In example embodiment 800, memory 830 can store information related to operation of wireless network platform 810. Other operational information can include provisioning information of mobile devices served through wireless platform network 810, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 830 can also store information from at least one of telephony network(s) 840, WAN 850, enterprise network(s) 870, or SS7 network 860. In an aspect, memory 830 can be, for example, accessed as part of a data store component or as a remotely connected memory store.

Figure 9:
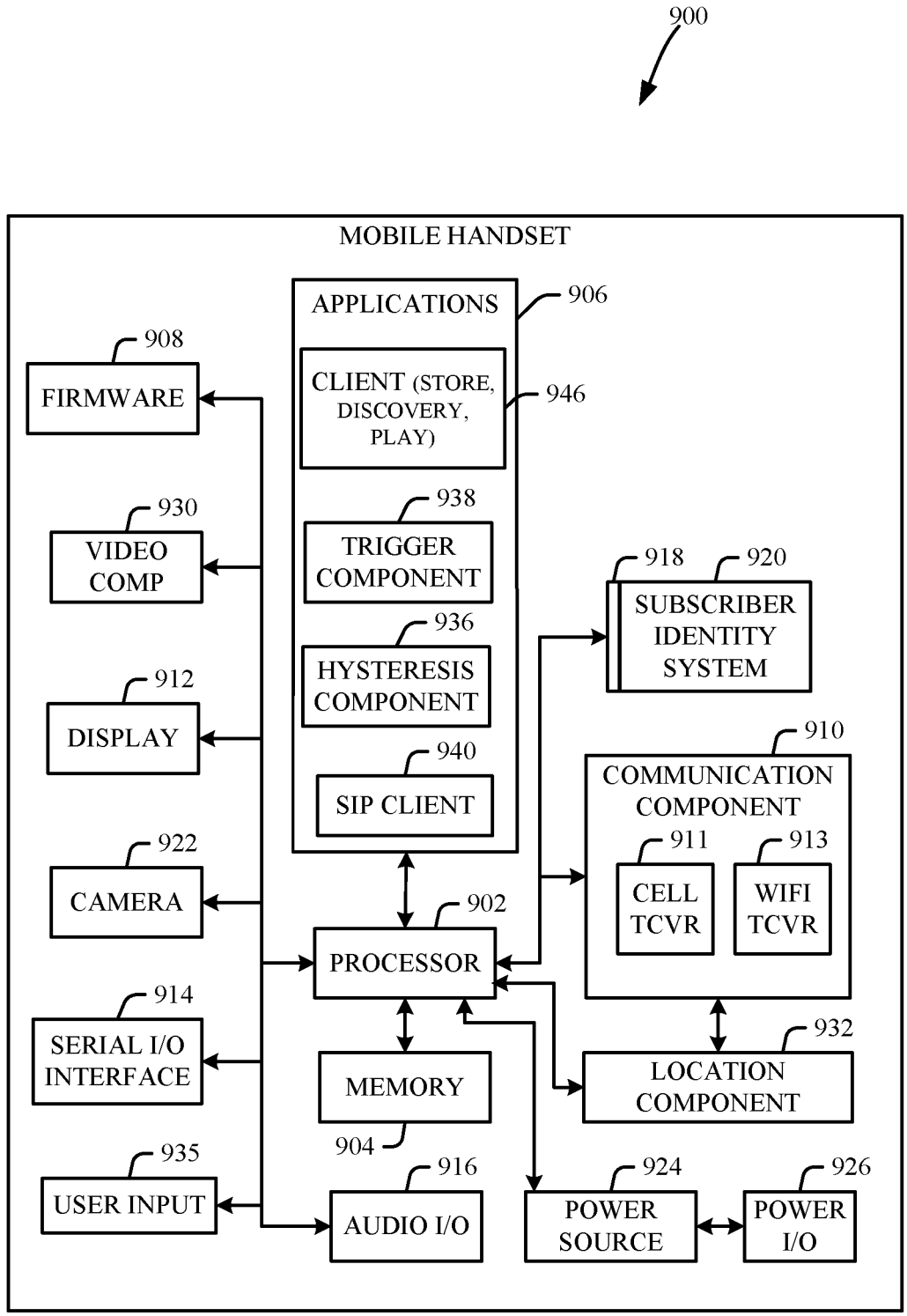
FIG. 9 illustrates an example block diagram of an example user equipment that can be a mobile handset in accordance with various aspects and embodiments of the subject disclosure.

Referring now to FIG. 9, illustrated is a schematic block diagram of an example end-user device such as a user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
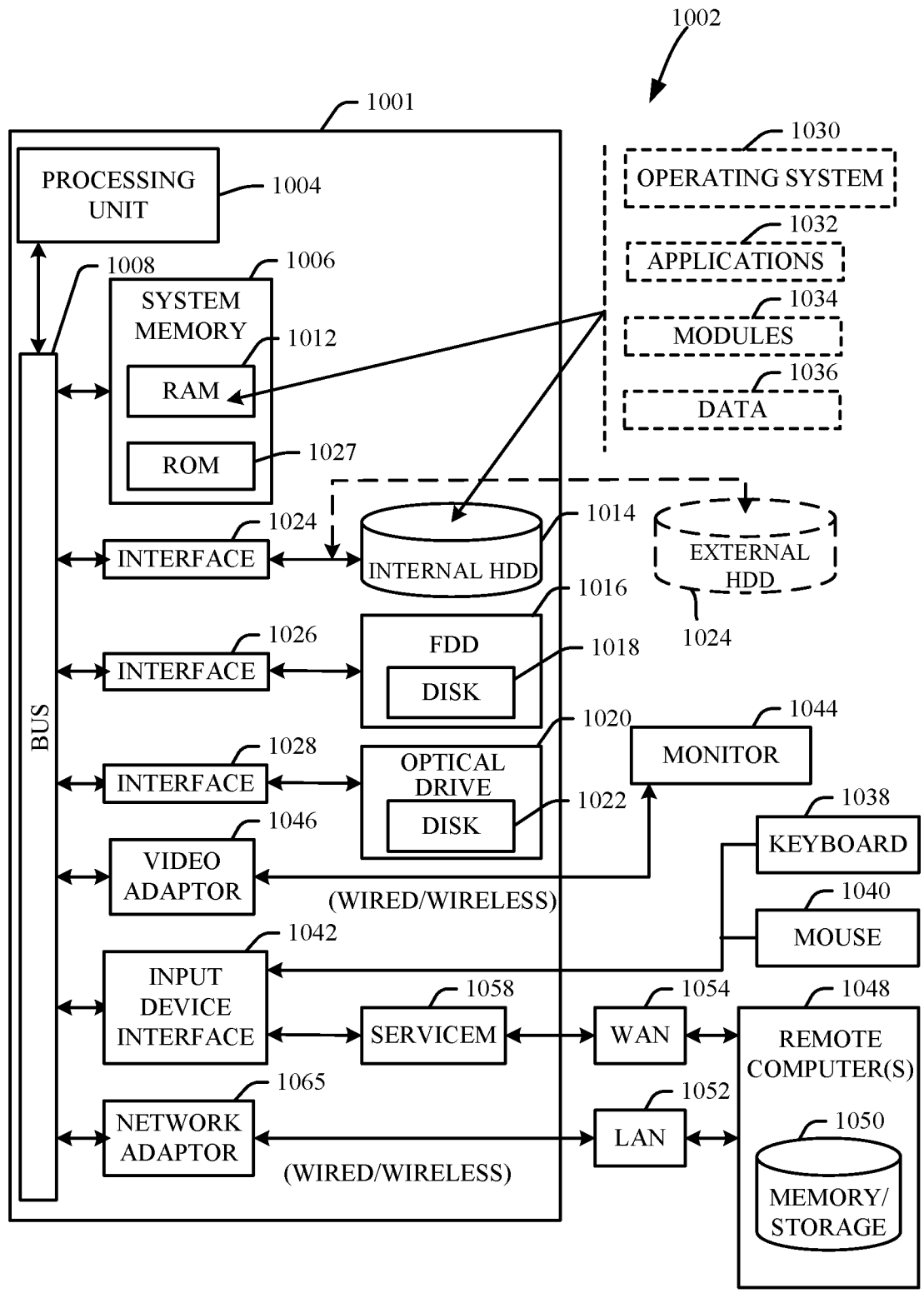
FIG. 10 illustrates an example block diagram of a computer that can be operable to execute processes and methods in accordance with various aspects and embodiments of the subject disclosure.

Referring now to FIG. 10, there is illustrated a block diagram of a computer 1000 operable to execute the functions and operations performed in the described example embodiments. For example, a network node (e.g., network node 106, GNB 202, etc.) may contain components as described in FIG. 10. The computer 1000 can provide networking and communication capabilities between a wired or wireless communication network and a server and/or communication device. In order to provide additional context for various aspects thereof, FIG. 1 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054.

Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 10 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. Network equipment, comprising:
   a processor; and
   a memory that stores executable instructions that, when executed by the processor, facilitate performance of operations, the operations comprising:
   receiving mobile bandwidth data from a mobile device, the mobile bandwidth data comprising an indication of bandwidth part information and a widest bandwidth part that the mobile device is capable of supporting, wherein the network equipment is part of a communications network;
   determining, based on the mobile bandwidth data, a first selected bandwidth part from among a group of bandwidth parts supported by the communications network that does not exceed the widest bandwidth part that mobile device is capable of supporting;
   assigning the first selected bandwidth part for scheduling communications of the mobile device;
   selecting, based on communications of the mobile device, a second selected bandwidth part that does not exceed the widest bandwidth part that mobile device is capable of supporting; and assigning the second selected bandwidth part for scheduling future communications of the mobile device, after the communications.

2. The network equipment of claim 1, wherein the operations further comprise maintaining, in storage accessible via the communications network, the mobile bandwidth data in association with an identity of the mobile device, and forwarding the mobile bandwidth data to a target cell in conjunction with a handover of the mobile device to the target cell.

3. The network equipment of claim 1, wherein the receiving of the mobile bandwidth data comprises receiving an information element that comprises an indication that the mobile device supports bandwidth parts.

4. The network equipment of claim 1, wherein the receiving of the mobile bandwidth data comprises receiving an information element that comprises data representing a maximum static bandwidth part supported by the mobile device.

5. The network equipment of claim 1, wherein the receiving of the mobile bandwidth data comprises receiving a first information element that comprises an indication that the mobile device supports bandwidth parts, and receiving a second information element that comprises data representing a maximum static bandwidth part supported by the mobile device.

6. The network equipment of claim 1, wherein the receiving of the mobile bandwidth data comprises receiving an information element that comprises data representing a maximum static bandwidth part per band supported by the mobile device.

7. The network equipment of claim 1, wherein the operations further comprise requesting the mobile bandwidth data from the mobile device, and wherein the receiving of the mobile bandwidth data occurs in response to the requesting of the mobile bandwidth data.

8. The network equipment of claim 1, wherein the receiving of the mobile bandwidth data comprises receiving an information element.

9. The network equipment of claim 1, wherein the receiving of the mobile bandwidth data comprises receiving the mobile bandwidth data as part of capability reporting by the mobile device.

10. The network equipment of claim 1, wherein the second selected bandwidth part is selected based on a change of data usage of the mobile device.

11. A method, comprising:
    receiving, by a processing system including a processor, mobile bandwidth data from a mobile device, the mobile bandwidth data comprising an indication of bandwidth part information and a widest bandwidth part that the mobile device is capable of supporting, wherein the processing system is part of a communications network;
    determining, by the processing system and based on the mobile bandwidth data, a first selected bandwidth part from among a group of bandwidth parts supported by the communications network that does not exceed the widest bandwidth part that mobile device is capable of supporting; and
    assigning, by the processing system, the first selected bandwidth part for scheduling communications of the mobile device;
    selecting, by the processing system and based on communications of the mobile device, a second selected bandwidth part that does not exceed the widest bandwidth part that mobile device is capable of supporting; and assigning, by the processing system, the second selected bandwidth part for scheduling future communications of the mobile device, after the communications.

12. The method of claim 11, wherein the receiving of the mobile bandwidth data comprises receiving an information element that comprises data representing a maximum static bandwidth part supported by the mobile device.

13. The method of claim 11, wherein the receiving of the mobile bandwidth data comprises receiving an information element that comprises data representing a maximum static bandwidth part per band supported by the mobile device.

14. The method of claim 11, further comprising requesting, by the processing system, the mobile bandwidth data from the mobile device, and wherein the receiving of the mobile bandwidth data occurs in response to the requesting of the mobile bandwidth data.

15. The method of claim 11, wherein the receiving of the mobile bandwidth data comprises receiving the mobile bandwidth data as part of capability reporting by the mobile device.

16. A non-transitory machine-readable medium, comprising executable instructions that, when executed by a processor of first network equipment of a communication system, facilitate performance of operations, the operations comprising:

receiving bandwidth data from a user device indicating a target bandwidth value that is supported by the user device;

assigning, based on the bandwidth data, a first selected bandwidth part from a group of bandwidth parts supported by a cell of the communication system that does not exceed the target bandwidth value;

communicating, to second network equipment that is part of the cell, information representing the first selected bandwidth part for use in scheduling communications of the user device;

selecting, based on communications of the user device, a second selected bandwidth part that does not exceed a widest bandwidth part that mobile device is capable of supporting; and assigning the second selected bandwidth part for scheduling future communications of the mobile device, after the communications.

17. The non-transitory machine-readable medium of claim 16, wherein the operations further comprise maintaining the bandwidth data in association with an identity of the user device, and forwarding the bandwidth data to a target cell in conjunction with a transfer of network service of the user device from the cell to the target cell.

18. The non-transitory machine-readable medium of claim 16, wherein the second selected bandwidth part is selected based on a change of data usage of the user device.

19. The non-transitory machine-readable medium of claim 16, wherein the operations further comprise requesting the bandwidth data from the user device, and wherein the receiving of the bandwidth data occurs in response to the requesting of the bandwidth data.

20. The non-transitory machine-readable medium of claim 16, wherein the receiving the bandwidth data comprises receiving an information element that comprises data representing a maximum static bandwidth part supported by the user device as the target bandwidth value.

\* \* \* \* \*